F. A. WHITTEN.
MOTOR VEHICLE.
APPLICATION FILED JUNE 17, 1918.
1,346,149.
Patented July 13, 1920.
2 SHEETS—SHEET 1.
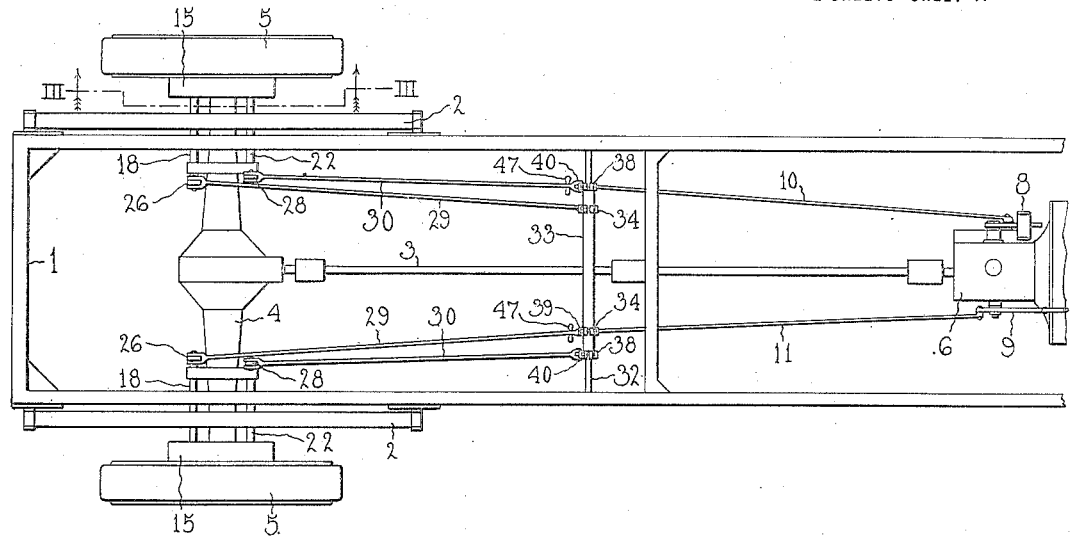
Fig. 1
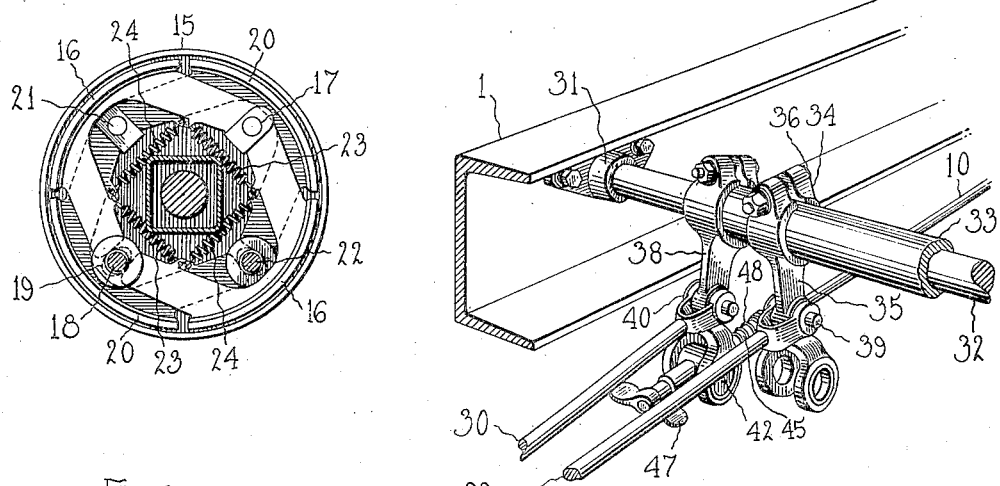
Fig. 2
Fig. 3
WITNESS:
Arthur F. Draper
INVENTOR.
Frank A. Whitten
BY
Lloyd Blackmore
ATTORNEY.

F. A. WHITTEN.
MOTOR VEHICLE.
APPLICATION FILED JUNE 17, 1918.

1,346,149.

Patented July 13, 1920.
2 SHEETS—SHEET 2.

WITNESS:
Arthur F. Draper

INVENTOR.
Frank A. Whitten
BY
Loyd Blackmore
ATTORNEY.

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

MOTOR-VEHICLE.

1,346,149.  Specification of Letters Patent.  Patented July 13, 1920.

Application filed June 17, 1918. Serial No. 240,370.

*To all whom it may concern:*

Be it known that I, FRANK A. WHITTEN, a citizen of the United States, and resident of Detroit, Wayne county, State of Michigan, have invented certain new and useful Improvements in Motor-Vehicles, of which the following is a specification.

The present invention has reference to brake operating mechanism for motor vehicles.

It is a matter of common experience that the service brakes of motor vehicles wear out much sooner than the little-used-emergency brakes; and it has been customary heretofore to re-line the service brakes as soon as they become worn to an objectionable degree. One of the main features of the present invention is the provision of brake operating mechanism of such nature that the set of brakes which initially serves as service brakes may thereafter readily be made to act for emergency purposes, the initial emergency brakes then performing the service functions. In this manner, the truck or other vehicle may be continued in operation until such time as both sets of brake linings require replacement, whereupon the wheels may be removed and all the brakes re-lined at once.

Another important feature of the invention resides in certain means whereby adjustment may be readily made for wear in any of the several parts which make up the connections between the brake levers and brakes.

Figure 5:
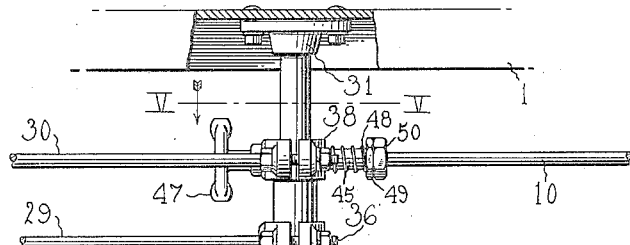
Figure 5:
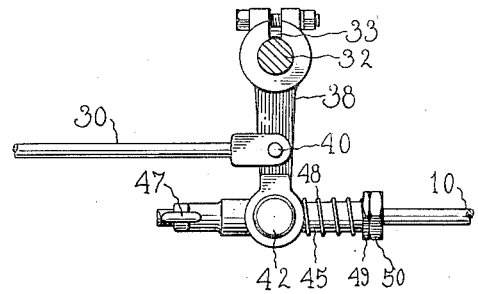
Figure 4:
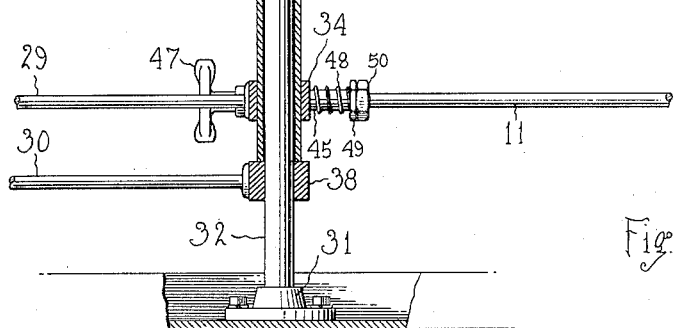
Figure 6:
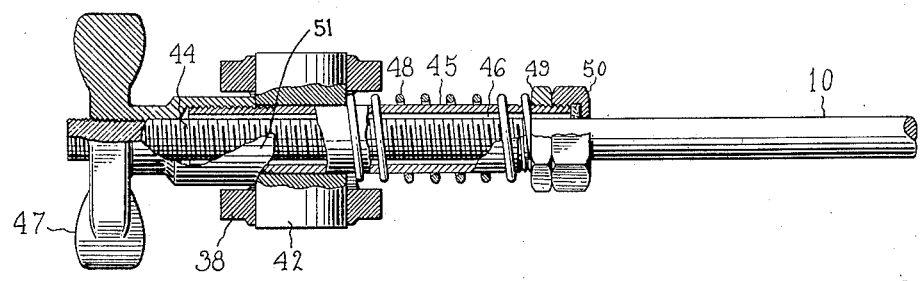

The invention further consists in various details of construction the nature of which will be understood from the following description together with the attached drawings, in the latter of which Figure 1 is a fragmentary plan view of a truck chassis provided with a preferred embodiment of the invention. Fig. 2 is a fragmentary perspective view looking forwardly and showing the rod connections at one side. Fig. 3 is a section on the line 3—3 of Fig. 1, showing one form of brake. Fig. 4 is an enlarged fragmentary plan view, parts being broken away, more clearly showing the relation of the cross shafts to the several rods. Fig. 5 is a section on the line 5—5 of Fig. 4. Fig. 6 is an enlarged plan view of the adjusting sleeve and nut partly broken away.

The chassis frame 1, springs 2, propeller shaft 3, rear axle 4 and wheels 5 may be of any desired type. The transmission casing appears at 6 and may support the pivoted foot pedal 8 and the pivoted hand lever 9, both of ordinary construction, whereby the front brake operating rods 10 and 11 may be drawn forward.

The brakes may be of any desired type, either external, or internal or both. As shown in Fig. 3, each wheel is provided with a brake drum 15 against the lining of which the brake shoes 16 (pivotally connected to each other and supported on the casing at 17) may be spread apart by the cam shaft 18 and cam 19. The brake also includes a second similar pair of shoes 20, pivoted to each other and connected to the casing at 21, which are operated by a second cam shaft 22. Springs 23 normally hold the shoes 16 out of effective braking relation with the drum, and other springs 24 have a corresponding function with reference to the shoes 20. This brake construction is merely one example of many forms wherein are embodied two sets of shoes, bands or other friction elements adapted to be independently operated for service and emergency purposes. Fixed to the inner ends of the shafts 18 and 22, are upstanding arms 26 and 28 to which the forwardly extending pull rods 29 and 30 are, respectively, pivotally attached.

The side members of the chassis frame 1 are provided on their inner faces at a point adjacent the front ends of the rods 29 and 30 and the rear ends of the rods 10 and 11 with alined bearing members or chairs 31 in which a cross shaft 32 is mounted, and this shaft, in turn, carries a centrally arranged tubular shaft 33 of considerably less length. The end portions of the latter, in the embodiment shown, are encircled by the split upper ends 34 of the depending arms 35, which are provided with clamping bolts 36, whereby they may be secured in proper relative angular adjustment about the shaft; and the shaft 32 is likewise provided, adjacent the ends of the tubular shaft, with similar depending arms 38. The forward ends of the rods 29 and 30 are pivotally connected at 39 and 40 to the corresponding arms 35 and 38, as is best shown in Fig. 2. It will be observed that the arms 38 have the additional functions of properly positioning the tubular shaft on the shaft 32. Obviously, when the tubular shaft is swung, both rods 29 are drawn forwardly or thrust backwardly equally; and the same is true with reference to the shaft 32 and the rods 30. It will also be noted that the arms 35—38 extend below the pivots 39—40 where they are preferably divided and transversely pierced to interchangeably receive a pivot shaft 42.

The rear ends of the rods 10 and 11 are threaded for considerable lengths at 44 to receive adjustable sleeve members or elements, each of which, in the embodiment shown, (Fig. 6) is formed in two parts—one a body or tubular portion 45 the inner surface of which is spaced from the threads of the rod to form an annular chamber 46 that is filled with grease when in use, and the other a wing-nut 47 threaded on the rear end of the portion 45; and also in threaded engagement with the threaded portion 44 of the rod 10, so that the said wing nut, together with the tubular portion, may be adjusted along said rod by rotating the said wing nut. The portion 45 passes through and is rotatable in the pivot 42, above referred to, and is surrounded, forwardly of the pivot, by a helical spring 48 and threaded to receive a lock-nut 49 and washer-retaining nut 50 against the former of which the spring seats; and which lock and retaining nuts therefore provide an abutment for one end of the spring 48. By turning the sleeve member 45—47, the rod may be properly adjusted relative to the pivot 42 without removing any pins, springs, or the like and without the use of tools, the effect being, of course, to take up slack and wear in the various brake operating members. For the purpose of holding the wing nut from working loose, its forward end surface is shaped on opposite sides to conform to the curvature of the pin 42, whereby the tension of the spring 48 is utilized to normally prevent rotation of the nut; which spring, however, yields as the wing nut is rotated to adjust the parts, the pin 42 being forced to the right against the action of the spring 48 as the wing nut is rotated by the projecting side portions of the nut, one of which is shown at 51 in Fig. 6.

It will be evident from the above that the rods 10 and 11 may be connected to either of the corresponding arms 35—38 at will, and that the change from one such connection to the other may be made by unscrewing only the wing-nut 47, withdrawing the rod 10 or 11 with the attached grease-retaining sleeve assembly from the pivot shaft 42, thus releasing the pivot shaft, for withdrawal, and re-assembling the parts in the reverse manner with reference to the other arm. The grease has no tendency to work out, serves as lubricant on the thread, and excludes water and dirt so that rusting is prevented and adjustment may be easily made.

Assuming that the brake elements operated by the shafts 22 and 18 are to be used initially respectively for service and for emergency purposes, the connection is made as shown, that is, the rod 10 is connected to the corresponding arm fixed to the shaft 32, and the rod 11 is likewise connected to one arm attached to the tubular shaft 33. This connection is maintained until the friction elements become worn to an objectionable degree, (adjustment being made from time to time by turning up on the nut or nuts 47) whereupon the rod 10 is shifted to the corresponding arm of the shaft 33 and the rod 11 is joined to the shaft 32. Then, when the pedal 8 is depressed, the brake elements operated by the shaft 18 are made to do service gripping, whereas the brake elements first used for service purposes are relied upon for emergency use. The greater leverage obtained through the hand lever 9 will give the required holding power for emergency work even with the worn linings.

It is evident that various changes may be made in the details of construction without departing from the spirit of the invention, such as fitting the rear rods 29 and 30 with the adjusters instead of the forward rods 11 and 10 as shown, and furthermore, the common expedient of equalizing bars might be employed instead of the cross shafts 32 and 33 in the connections between the front and rear rods.

It must also be noted that cables might be used instead of rods, and I do not, therefore, wish to be limited except as indicated by the subjoined claims.

I claim:

1. In a motor vehicle having a service brake and an emergency brake, a pair of rods each connected to a corresponding brake, a pair of cross shafts on which corresponding ends of the rods are respectively supported, a lever, a third rod, and means whereby the third rod may be operatively connected to either of the two first mentioned rods at will.

2. A motor vehicle comprising in combination a service brake and an emergency brake, a pair of operating rods, one for each brake, a cross shaft, an arm rotatable with the cross shaft and pivotally connected to one of the rods, a tubular shaft mounted to turn on the cross-shaft, an arm rotatable with the tubular-shaft and pivotally connected with the other rod, a third rod arranged to be interchangeably connected to either of the arms at will, and a lever for actuating the third rod.

3. In a motor vehicle having a service brake and an emergency brake for each of two oppositely located wheels thereof; a rotatable cross shaft; a tubular shaft rotatable upon said cross shaft; a pair of brake operating arms arranged adjacent one another and secured one to said tubular shaft and one to said cross shaft, and which arms are arranged at one side of the vehicle; a second pair of brake operating arms located upon the other side of the vehicle and secured one to said tubular shaft and the other to said cross shaft; operating rods extending from said brake operating arms to said brakes; a lever; a rod extending from said lever to and the end of which is adapted to be connected with either one of the two brake operating arms of one of said pairs of arms; a second lever; and a second rod extending from said second lever to and the end of which is adapted to be connected with either one of the two brake operating arms of the other of said pairs of arms.

4. In a motor vehicle having a pair of service brakes, and a pair of emergency brakes, operating rods therefor, a rotatable cross shaft, a tubular shaft rotatable thereon, pairs of arms fixed respectively to the shafts, the members of each pair of arms being pivotally connected to the corresponding rod, a foot pedal and a hand lever and a pair of rods, one connected to the foot pedal and the other to the hand lever, the parts being so constructed and arranged that one of the last named rods may be pivotally connected to an arm on the cross shaft and the other likewise connected to an arm of the tubular shaft, or the first of the last named rods may be pivotally connected to the other arm of the tubular shaft and the second of the last named rods likewise connected to the other arm of the cross shaft.

5. In a motor vehicle having service brakes and emergency brakes, a rotatable cross shaft, a tubular shaft rotatable on said cross shaft, a pair of arms fixed to the cross shaft adjacent the ends of the tubular shaft, a pair of brake operating rods with which the said arms are connected, a second pair of arms fixed to said tubular shaft, a second pair of brake operating rods with which the said second pair of arms are connected, two other rods either of which is adapted to be operably connected to either the tubular shaft or the cross shaft at will, and means for manually and independently actuating the two last mentioned rods at will.

6. In brake mechanism for motor vehicles, a pair of independently operable brakes, rods for operating the brakes, arms swingable about a common axis for actuating the rods, a lever, a third rod connected to the lever, and means whereby the third rod may be operatedly connected with either of the arms at will, said means including manually operable means for taking up wear and for establishing a proper initial adjustment.

7. In brake mechanism for motor vehicles, a swingable arm, a brake rod pivotally connected thereto, a second rod, and means for attaching the second rod to the arms, said last named means including a pivot, a sleeve surrounding said second rod and passing through the pivot, a threaded connection between said sleeve and said rod, a spring tending to force the sleeve through the pivot in one direction, said sleeve being rotatable for causing relative movement of the rod and pivot.

8. In brake mechanism for motor vehicles, a swingable arm having a divided end, a rod, means for attaching the rod to the arm, said means including a pivot passing through the division of the arm, a sleeve slidable through the pivot, said sleeve being spaced from the rod to afford a chamber for lubricant, a spring tending to thrust the sleeve in one direction, said sleeve being adjustable longitudinally on the rod.

9. In a brake mechanism for motor vehicles, a swingable arm having a divided end, a pivot passing through the divisions of said end, a rod passing through the pivot, a spring tending to thrust the rod in one direction, and a spring held retaining member threaded on the rod and having depressions engaging with the surface of the pivot to lock the retaining member against movement relative to the rod.

10. In brake mechanism for motor vehicles, a swingable arm having a divided end, a pivot passing through the divisions of said end, a rod passing through the pivot, a sleeve surrounding the rod and slidable through the pivot, a spring surrounding said sleeve and acting between an abutment at one end thereof and the pivot and tending to force the sleeve in one direction, and a nut secured to the other end of the sleeve and acting as a stop against which the pivot bears, and which nut is in threaded engagement with the rod whereby adjustment of the rod and sleeve relative to the pivot is provided for.

11. In a motor vehicle having a service brake and an emergency brake, a pair of cross shafts operatively connected one with each of said brakes and whereby the brakes are respectively operated, a lever, and means whereby the lever may be operatively connected with and interchangeably utilized to operate either one of said cross shafts to thereby actuate either brake at will.

12. In a motor vehicle having a service brake and an emergency brake, a pair of cross shafts operatively connected one with each of said brakes and whereby the brakes are respectively operated, a lever, a rod extending from said lever to said cross shafts, and means whereby the rod may be interchangeably connected with either one of said cross shafts, to thereby actuate either brake at will.

13. In a mechanism of the class described, a pivot, a rod passed through said pivot and having a relatively long thread; a sleeve member surrounding said rod and extending through said pivot and spaced apart therefrom to thereby provide a lubricant contained chamber, and the end of which sleeve member is threaded; and a nut in engagement with the threaded portion of said sleeve and in engagement also with the thread upon said rod whereby said sleeve may be moved longitudinally of said rod.

14. In a mechanism of the class described, a bifurcated swinging lever having bearings in its arm; a pivot located within said bearings; a sleeve extending through said pivot; an abutment located at one end of said sleeve; a spring surrounding said sleeve and the ends of which bear against said abutment and against said pivot; a threaded rod extending through said sleeve; a nut in engagement with said threaded rod and in engagement also with said sleeve, so that said sleeve may be rotated by rotating said nut; and a stop against which said pivot pin is forced by the action of said spring.

15. Brake operating mechanism comprising a service brake and an emergency brake, rods for operating the brakes, a pair of swingable arms of equal lengths to which the rods are respectively connected, a third rod arranged to be interchangeably connected to the arms at equal distances from the points about which they swing, and a lever for actuating the third rod.

In testimony whereof I affix my signature.

FRANK A. WHITTEN.